March 5, 1940.    H. P. EANES    2,192,674
WARP TYING MACHINE
Filed Oct. 18, 1937    11 Sheets-Sheet 3

March 5, 1940.

H. P. EANES

2,192,674

WARP TYING MACHINE

Filed Oct. 18, 1937

Patented Mar. 5, 1940

2,192,674

UNITED STATES PATENT OFFICE 2,192,674

WARP TYING MACHINE

Hugh P. Eanes, Winston-Salem, N. C.

Application October 18, 1937, Serial No. 169,738

18 Claims. (Cl. 28—49)

My invention relates to an improvement in warp tying machines.

One of the vexing problems in the operation of machines of this general type in the past, is what is commonly known as "clinging," which causes double selections, which means that if the selector catches two threads, top or bottom, there would be three warp threads in the knot, which is recognized to be one of the greatest difficulties to be overcome in the tying art.

A primary object of my present invention is to overcome this difficulty, and my present invention will treat of placing warp threads with precision in a selectable position, and binding them uniformly in that position, in succession, one at a time, so as to prevent double selections.

This invention is also means of holding the threads in orderly fashion, to follow successively next to and behind the one being selected, in such a firm grasp at the time of selection that the next following thread is precluded from "clinging" to the selected one.

The mechanism of this present machine actually takes five or six threads of the two warps at a time and holds them, selecting one above and below at a time, from the rest, while holding the remaining warp threads in waiting in a firm grasp, in readiness for single presentation.

In my present machine, the two warp threads to be selected with precision are always in exactly the same position for each selection.

With these objects in view, my invention consists in a reciprocating type of pusher and selector, a fixed arrow-head which enters and always remains between the upper and lower layers of warp, the threads being presented in a continuous succession, one after another, with the forward movement of the machine, together with means for holding the warp threads under suitable tension while the knotter ties the warps.

My invention also includes a number of other cooperating elements, as illustrated in the drawings, and which will be hereinafter fully described and claimed.

A, represents a carriage. This is mounted at opposite ends on wheels 2 and 3, which latter travel on tracks 4 on the bed 5 of the machine.

A fixed arrow-head 6 projects forwardly from an upstanding plate 7 to which it is rigidly secured in any approved manner, as by a nut 8, and the plate 7 in turn is held fast to the carriage A, so that the arrow-head 6 is at all times stationary. At the forward end of the arrow-head, the two layers of warp threads are at first slightly spread apart by traversing the upper and lower edges of the arrow-head until they reach the high point or widest portion 9 of the arrow-head, and thence changing their direction around the curved or rounded shoulder 10 at the rear of the arrow-head, at the end of which they are temporarily arrested, one by one, by a notch 11 which is intended to receive a single thread at a time.

Fingers 12 and 13 also project forwardly from the upstanding plate 7 on opposite sides of, and suitably spaced from, the arrow-head. These fingers are adjustable back and forth with respect to the shoulders 10 on the rear of the arrow-head 6 in order to form channels according to the size of the warp threads being tied, and the purpose of these channels is to preserve an orderly and single-file movement of the threads over the shoulders, thus preventing crowding and choking, and insuring a successive presentation of a single upper and lower thread to the selector at a time, that is to say the adjustment of the fingers is to regulate the width of the channel 14 between the shoulders 10 of the arrow-head and the curved forward tips 15 of the fingers to fit the size of the particular warp threads to be tied. The curved forward tips 15 of these fingers constitute back stops against the threads to be tied, and in cooperation with the curved shoulders 10 of the arrow-head they confine the on-coming threads to a single row and insure the presentation of a single thread to the selector.

P, is a pusher. This is preferably more or less in the form of an arrow-head. The pusher has a sliding movement in the upstanding plate 7, and in the post 40, which is suitably spaced back of plate 7, and the two together support and guide the pusher in its reciprocating movements. A stop 41 is adjustably secured on the shank of the pusher between the plate 7 and the post 40, and is adapted to be set to regulate and limit the stroke of the pusher by striking against the post to which it returns and where it is normally held by the spring 42 coiled around the shank of the pusher and confined within the space between the plate 7 and the adjustable stop 41, against both of which it is adapted to press at all times. The pusher is moved forward by means of an arm 43 which projects laterally from a cross-head 44 secured on the reciprocating plunger 45. The rear end of the pusher shank protruding through the post 40 is provided with a stud 46 standing in the path of the arm 43, which latter on striking the stud forces the pusher P to a position just far enough forward to urge some five or six of the rearmost threads of both layers of threads from the rest of the threads with each reverse or rearward movement of the pusher as the arm 43 is withdrawn from the stud 46.

Thus the pusher serves as a booster to insure that several threads are always feeding through the curved spaces 14 between the curved shoulders of the arrow-head 6 and the curved tips 15 of the adjustable fingers 12 and 13.

Figure 1:
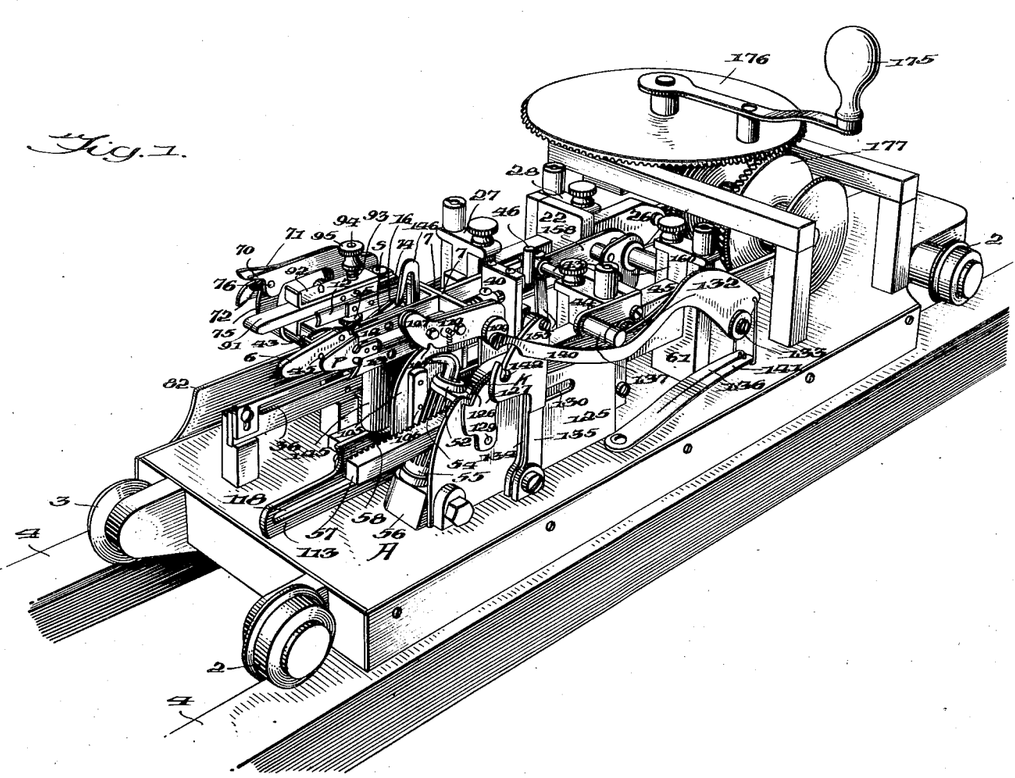
Fig. 1 is a view in perspective showing the machine mounted on tracks on the machine-bed.
Figure 2:
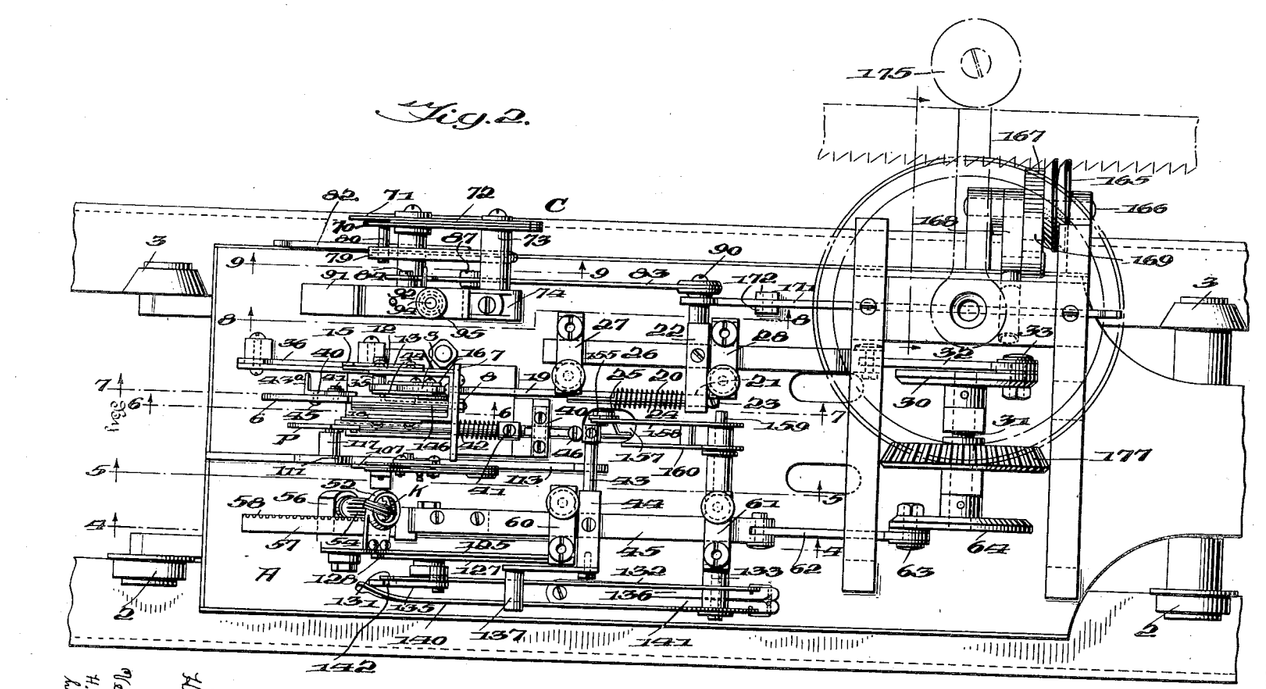
Fig. 2 is a top plan view.

A selector S is slidably mounted and reciprocates in the space between the shank 18 of the arrow-head 6 and one pair of the fingers 12 and 13, as viewed in Fig. 2.

This selector is more or less heart-shaped, with the smaller end pointing forward and in position to enter the space formed by the arrow-head 6 between the layers of warp. The rear end of the selector S is fashioned with two sharp points 16 at its greatest transverse diameter, each of which selects the thread lying in its path in the notch 11 with each return or rearward stroke of the selector. In order to do this, these points push between these threads in the forward stroke of the selector and catch and pull them back on the back or reverse stroke.

The selector is secured on the forward end of a bar 19 which is slidably mounted against rocking in a slot in the upstanding plate 7, which latter not only holds the bar against turning but also forms a guide therefor, and the rounded shank 20 at the rear extends slidably through a hole 21 in a cross-head 22. A stud or screw 23 in the protruding rear end of this shank 20 of the selector forms a stop against which the cross-head 22 strikes in order to retrieve the selector. A spiral spring 24 is sleeved around the shank 20, and is confined between the cross-head 22 and a shoulder 25 formed at the juncture of the bar 19 and the shank 20 of the selector. This spring 24 not only holds the selector forward to its work, but also permits it to stop before completing its full forward stroke, if it meets with an obstruction, without interrupting any of the other moving parts of the mechanism. This only happens occasionally, as when a thread breaks or fails to present itself in the required predetermined position in either of the notches 11 at the rear end of the arrow-head 6.

Two rockers 40 are each nearly balanced on a pivot 41 on one side of the arrow-head, one immediately above the other, and they swing in opposite directions. Each rocker has a seat 42 on the rear end in which the threads in the notches 11 temporarily rest, the tension of the threads bringing the seats of the rockers into alignment with the notches 11.

The forward end of each rocker terminates in an outwardly extending counterbalancing lug 43' which drops in front of an extension 44' projecting forwardly from the selector when a thread breaks or fails to reach the proper position to be caught by the selector. Studs 45 limit the rocking movement of the rockers 40 in one direction. The next on-coming threads tilt the rockers back to normal and remove the stop from the path of the extension 44' on the selector.

Figure 6:
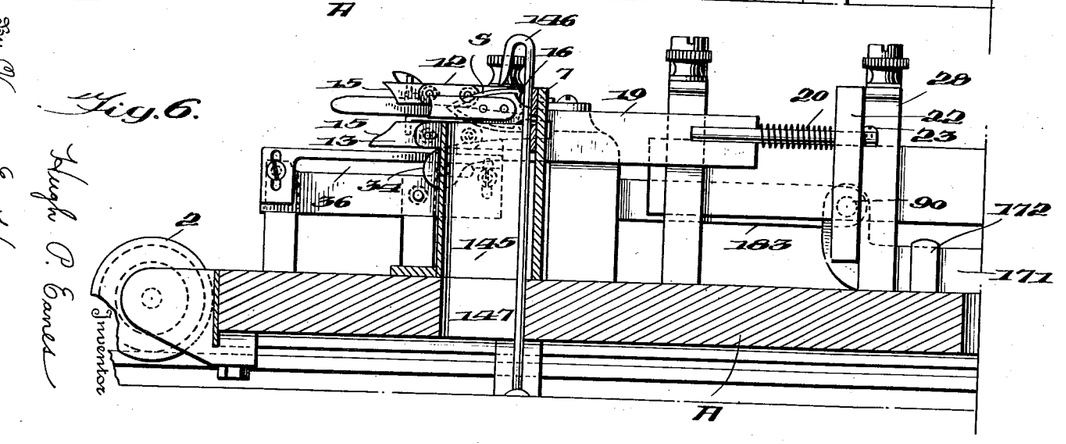
Fig. 6 is another similar section on the line 6—6 of Fig. 2, looking in the direction of the arrows.

The cross-head 22 is secured on the reciprocating plunger 26, and this plunger is supported and guided by, and reciprocates in slots therefor in, the two pillow-blocks 27 and 28, between which pillow-blocks the cross-head 22 is confined in its forward and reverse movements. The reciprocating plunger 26 is positively driven back and forth by a crank disk 30 keyed on a shaft 31, through the connecting-rod 32 and wrist-pin 33. An arm 34 extends downwardly from the bar 19, and a stud 35 extends laterally therefrom into the guide slot 36 (see Figs. 6 and 7) which prevents vertical vibration of the selector which must be precise and unerring in its action. Thus the function of the selector is to always select the nearest warp thread from each row of threads being urged forward by the pusher P, around the shoulder 10 on the arrow-head 6.

Figures 4, 15:
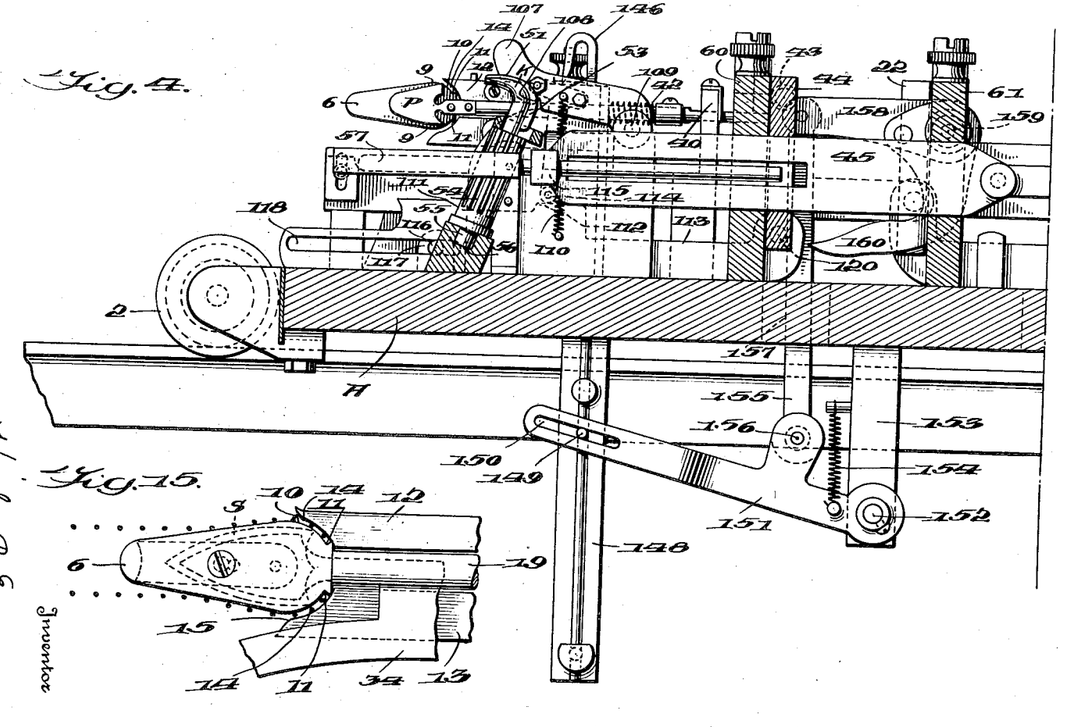
Fig. 4 is a vertical longitudinal section taken on the line 4—4 of Fig. 2, looking in the direction of the arrows.
Fig. 15 is an enlarged fragmentary detail showing the arrow-head and the feed of the layers of warp threads over the upper and lower edges thereof.

K, represents the knotter. This is a well-known type of knotter and consists of a split bill 50 and a pivoted bill 51, operating between the two parts of the split bill and around and by this knotter the knot is formed, and between the bills the threads are received and held while the loop over the head of the knotter is pulled thereover, after which they act as shears to cut the thread. A ring 52 around the head of the knotter acts as a cam on the back 53 of the pivoted bill 51 to cause the opening and closing of the latter. The knotter is attached at its lower end to the elongated rack-toothed gear 54, the lower end 55 of which turns in a bearing 56. The elongated gear 54 is, for convenience, inclined at an angle as shown in Fig. 4, and a rack bar 57 with similarly inclined rack teeth 58 meshes with the teeth 54. This rack-bar 57 is attached to the forward end of the plunger 45, which is mounted to reciprocate to the two pillow-blocks 60 and 61. A connecting-rod 62 extends from the rear end of the plunger 45 to the wrist-pin 63 by which it is pivotally attached to the crank disk 64 on the shaft 31 preferably at a little less than 190° from the attachment of the connecting-rod 32 from plunger 26 to the wrist-pin 33 on the crank-disk 30, so that the two are never on dead centers with respect to each other. A knot is tied with each forward reciprocation of the plunger 45 and rack-bar 57, the knotter first turning in one direction and then reversing and turning in the opposite direction, but always turning in a counter-clockwise direction when it ties the knot.

The selector makes one complete backward stroke for each knot tied. The pusher P makes its short forward stroke just as the selector completes its backward stroke, and it completes its backward stroke in the act of boosting or urging the rows of threads over the shoulders 10 on the rear of the arrow-head, just as the selector starts forward, thus leaving the upper and lower innermost threads actually in the path of the widest portion of the selector ready to be selected or carried backwardly by the sharp pointed rear ends 16 of the selector on the return or backward stroke, to the exclusion of all other threads.

In this the accuracy and dependability of the invention resides, that is to say, in the precision with which these threads are presented in orderly arrangement, one at a time, from each layer of threads as they await their turn in the path of the selector to be separated from the rest with each backward stroke of the selector, and the function of the picker in its turn is to insure this steady progressive movement of the two rows of threads held firmly around the shoulders 16 of the arrow-head 6 in two perfectly timed backward processions, so to speak.

In the presentation of the two layers of thread to the pusher and the knotter, the threads, of course, are positioned in two tranverse layers, and as the carirage A moves forward on the tracks 1, the threads find their way over the smooth opposite edges of the arrow-head 6 between the blades of the cutter C, two tension devices, one on either side of the picker and selector, and in the path of the knotter in substantially horizontal planes and more or less in a direct line transversely of the machine.

Figures 7, 8, 9:
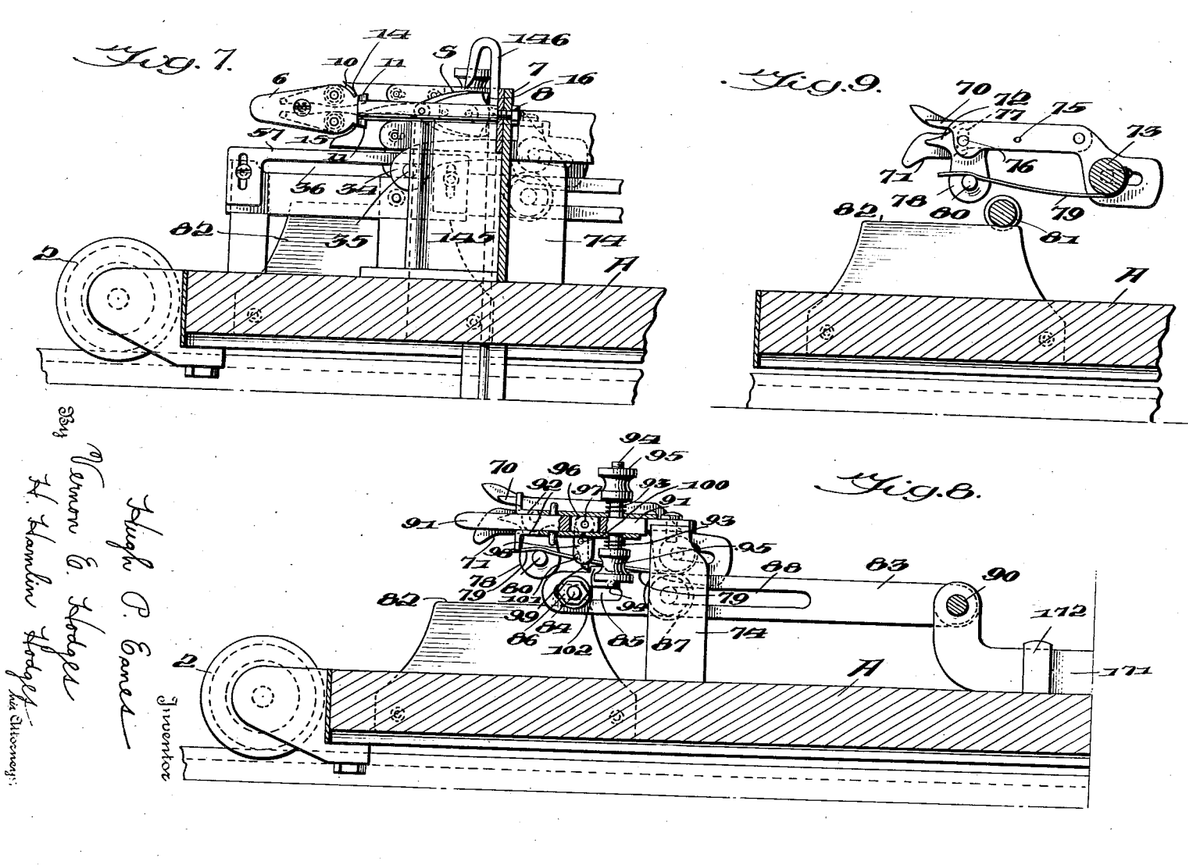
Fig. 7 is a fragmentary longitudinal sectional view on the line 7—7 of Fig. 2.
Fig. 8 is a fragmentary view on the irregular line 8—8 of Fig. 2.
Fig. 9 is a detail fragmentary sectional view on the line 9—9 of Fig. 2.
Figure 10:
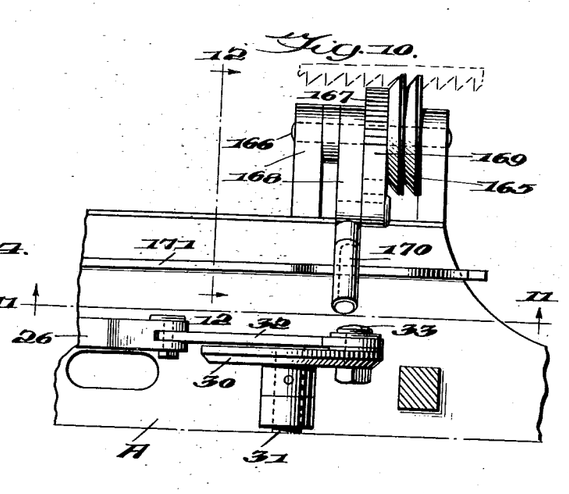
Fig. 10 is a detail fragmentary plan view on an enlarged scale of the right-hand portion of the machine.

The cutter C is in the nature of a pair of shears, the inner blade 70 and the outer guard 71 of which are stationary with a space therebetween for the blade 72. The blade 72 is pivotally mounted on an arm 73, which projects laterally from a post 74 rising from the carriage A, so that the pivoted blade is confined and held against lateral vibration by the shank of the stationary blades 70 and the guard 71. A pin 75 limits the downward movement of the pivoted blade 72, and a rivet 76 extends from the stationary blade 70 into a clearance slot 77 in the pivoted blade (as shown in Fig. 9). A cam 78 depends from the pivoted blade where it is held yieldingly by spring 79 extending from the arm 73 and over the stud 80, in the path of a trip 81 which moves back and forth on a straight horizontal flange 82 extending upwardly from the carriage A.

The trip 81 moves back and forth on the flange 82 beneath the cam 78, and in this way with each forward and backward stroke it causes the shears to cut the threads. The trip 81 is adjustably secured to the forward end of a strip 83, by a bolt 84 extending through a slot 85 in the strip 83 and the nut 86.

The strip 83 is guided and held in place by a button 87, which extends through an elongated slot 88 in the strip 83 and is screwed into the post 74, all of which is shown in detail in Fig. 8.

The rear end of the strip 83 is attached to the cross-head 22 by a bolt 90, by which cross-head it is reciprocated.

The two tension devices will now be described. A tongue 91 projects forwardly from the post 74 to the top of which it is rigidly secured by a bolt or screw. Located above and below the tongue and supported thereby are the tension jaws 92, they being held under tension by springs 93 on small screws 94 which latter project upwardly and downwardly from the tongue 91 through holes therefor in the jaws, and the tension of these jaws 92 upon the warp threads is regulated and adjusted by thumb-nuts 95 on these screws 94 by the expansible pressure of the springs 93 between the thumb-nuts 95 and the tension jaws 92. The jaws 92 are opened to release the warp threads at timed intervals by rocker arms 96 extending in opposite directions from a central bearing 97 pivotally supported in the tongue 91, where the rocking of the bearing 97 causes the arms 96 to move outwardly in opposite directions through an opening in the tongue against the inner surfaces of the jaws 92 in order to spread them to release the warp-threads held therebetween at timed intervals.

A crank-arm 98 depends from one end of the bearing 97, and an escapement 99 hangs from a pin 100 thereon. The movement of this escapement is limited in one direction by a stop pin 101, but it is left free to swing in the opposite direction. The lower end of this escapement lies in the path of a lug 102 on the upper edge of the strip 83, which lug brushes the escapement aside on the backward stroke, but moves it on the forward stroke, thereby rocking the rocker arm 96 whereby to cause the tension jaws 92 to spread apart, thereby relieving the tension exerted on the warp threads.

Another tension on the opposite side of the picker and selector from the one just described is relatively simple. It consists, in the main, of a plate 105 extending upwardly from the carriage A to which it is rigidly secured by a bracket 106. This is straddled at the top by two spaced plates 107 secured together and having a notch 108 at the lower edge, which receives the two warp threads as they come together preparatory for the knotter.

These two plates constitute a tension head. They operate as one element, and are pivotally mounted at the rear on a pin 109 on the rear of plate 105. A slender spring 110 pulls the tension head downwardly and with a slight frictional hold thus created on the warp threads exerts just enough tension thereupon to allow the knotter K to pull the threads through as required to properly tie the knot.

Figure 5:
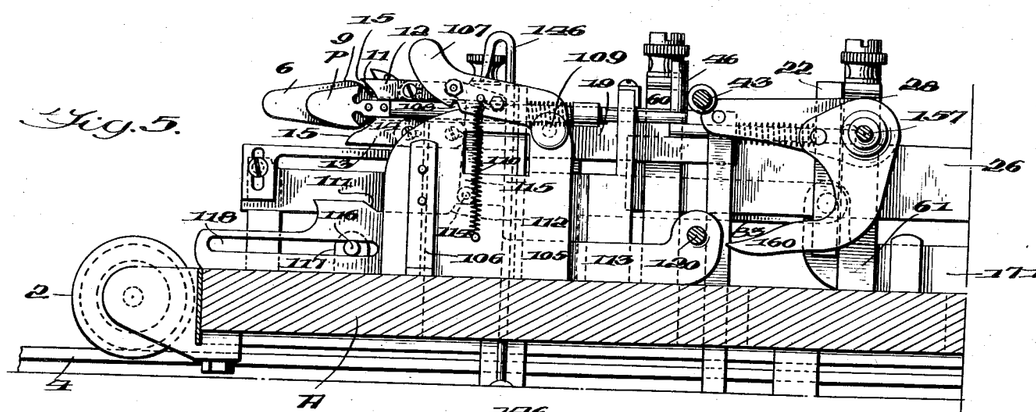
Fig. 5 is a similar section on the line 5—5 of Fig. 2, looking in the direction of the arrows.

This tension head is lifted in the release of the warp threads against the action of the spring 110 by two cams 111 and 112 on the upper edge of the cam strip 113 moving against a roller 114 on the lower end of an arm 115 depending from the tension head. The cam strip 113 rests and slides conveniently upon the surface of the carriage A where it is confined between the post 40 and the plate 105. The cam strip is likewise confined in its rectilinear movement by a pin 116 extending laterally from a lug 117 on the carriage A through an elongated slot 118 in the cam strip 113, as shown in Fig. 5. The space between the cams 111 and 112 affords clearance for the roller 114 on the arm 115 to permit the closure of the tension head upon the warp threads. The cams 111 and 112 release the warp threads twice during each reciprocation of the cam strip 113.

The first-described tension device receives the warp threads and holds them under tension until the selector S has completed its full back stroke, whereupon it releases the warp threads, but just before this release and with the start of the forward motion of the selector, the last-described tension device holds the threads sufficiently long until the knotter gathers the required amount of the threads into the knot. The cam strip 113 is moved back and forth by stud 120 projecting inwardly from the cross-head 44 on the reciprocating plunger 45.

An upstanding plate 125 is bolted securely at one side of the carriage and runs along parallel with the rack bar 58, and opposite the knotter K it has a notch 126 in which the two threads being knotted are adapted to find a temporary resting-place.

There are three cam levers at the left of the machine and a post having a half-round opening through the top, all of which co-operate in manipulating the warp thread during the formation of the completed knot. The cam lever 127 is the innermost of these three levers and is located alongside and just outside the upstanding plate 125, and is the nearest of the three cam levers to the knotter. This lever is pivoted at its rear end to the cross-head 44, so that it moves forwardly and backwardly with the cross-head. The forward end of this lever is provided with a hook 128. This little hook picks up the thread just as it is brought by the selector S up to and under the chin of the duck's bill of the knotter K.

Figure 3:
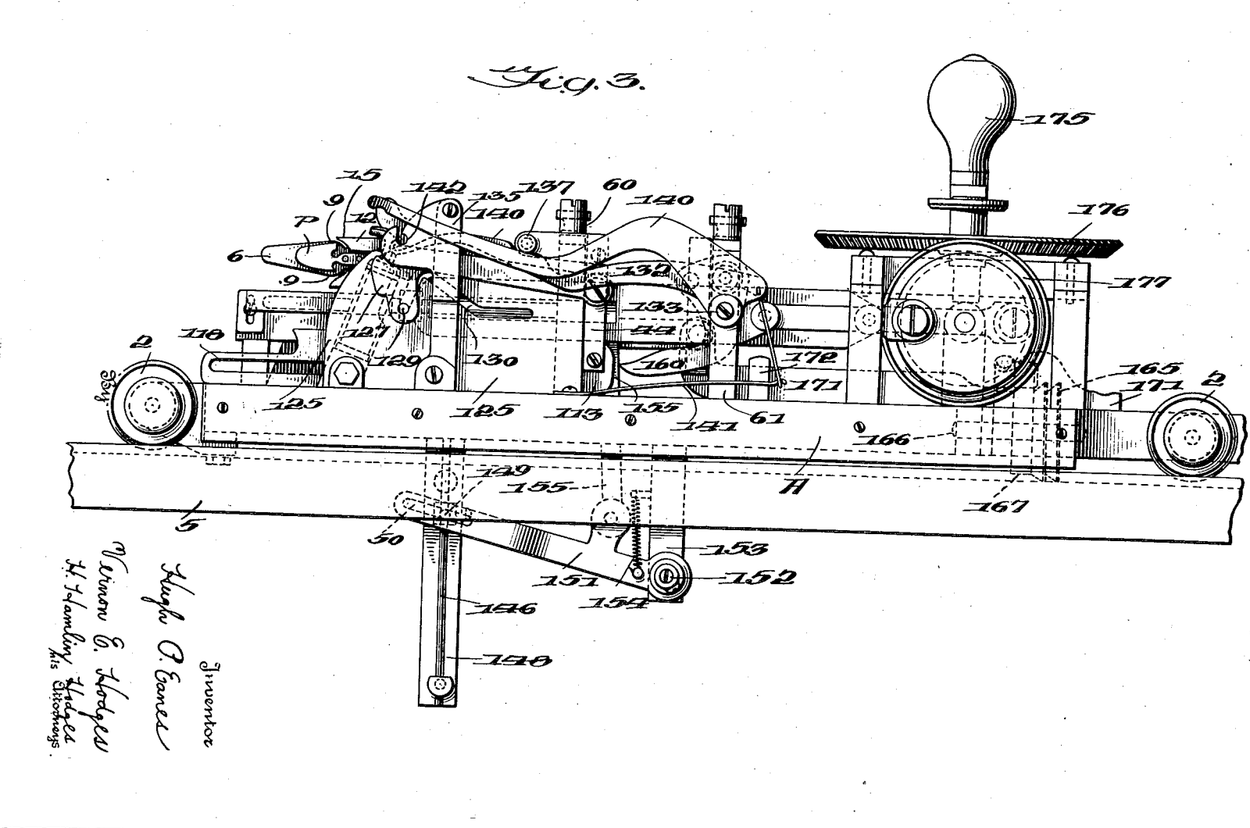
Fig. 3 is a view in side elevation.

This lever has an inwardly extending roller 129 which travels in a V-shaped cam 130 in the form of a slot extending through plate 125, as shown in Fig. 3. The threads T are elevated by the action of this hook and at the same time brought backwardly to a position which causes the thread to cross the duck's bill just as the knotter starts its rotary motion. The bill is then turning to the left (looking the way the carriage travels). This cam lever falls lower on its backward course, having passed over the high point in the V-shaped slot 130. The hook 128 now delivers the thread to an eyelet 131 in the forward end of cam lever 132. This cam lever 132 is pivoted at its rear end on a stud 133 projecting out from the pillow-block 61. Its forward end is guided through a slot 134 in the post 135. A spring 136 connected thereto just back of the pivot, tends to hold this cam lever 132 upwardly at its forward end. A roller 137 carried by the cross-heads 44 on the plunger 45 travels over the upper cam surface of this lever 132 with each forward and backward stroke to cause the forward end of the eyelet to move downwardly a slight distance with the backward stroke and a greater distance with the forward stroke of the cross-head and roller 137.

This cam lever 132 has a very short up and down motion due to the cam formation on its upper edge as it presses upwardly against the roller 137 which controls it. It holds its last assumed position with the threads to be tied held in the eyelet 131. The tension of the spring 136 which is relatively slight causes the eyelet to support the thread now in the process of being tied, in a yielding manner, furnishing just enough tension to keep the threads from kinking, while the duck's bill is forming the knot. This is the function of cam lever 132. When the knot is formed, the eyelet 131 is still holding the thread yieldingly, and is pulled downwardly simply by the tension of the threads, as cam lever 140 is drawing the knot tight, and stripping it from the knotter, the knotter still holding the threads tight enough at the last moment for the lever 140 to draw the knot as tight as desired before it is cut loose by the knotter.

This lever 140 is also pivoted on stud 133 on the cross-head 61, preferably being the same stud on which lever 132 is mounted, and it is actuated in the same way by spring 141 in one direction, and by roller 137 in the other direction. The post 135 has a half-round notch 142 which furnishes a support for the threads after they have been tied in such a manner as to insure a level pull off the bill of the knotter, since this notch 142 is in a fixed position, thereby providing a uniform distance for the tied ends to be pulled when drawing up or tightening the knot.

In this connection, reference should again be had to the tension device on the opposite or right-hand side of the knotter which has been previously described in detail. This tension device opens just long enough to receive the two threads being brought backwardly by the selector S, and closes while the knot is being formed, and then opens in time for the hook 146 which pulls the short section of waste threads severed by the cutter and the knotter down into the waste box 145. These waste pieces of thread are about two inches in length and are cut out and removed from the machine with the tying of each knot. The hook 146, as shown in Figs. 1, 2, 5, 6 and 7 is located in the rear of the waste-box 145, where it moves up and down at intervals, it being adapted to catch the waste threads, two at a time, as they are severed from the warps and dispose of them through the waste box and through a hole 147 in the carriage. The shank of this hook is slidably connected with a hanger 148 depending from the lower side of the carriage, see Fig. 3. A pin 149 projects outwardly from the shank of the hook 146 into a slot 150 in the lever 151, and the latter is connected by a pivot 152 to the bracket 153 also depending from the carriage A, as illustrated in Figs. 3 and 4. A spring 154 extends from the lever 151 to the bracket 152, and is of sufficient strength to raise the lever and hence the hook to the position shown in Figs. 3 and 4. A rod 155 is pivotally connected by pin 156 to the lever 151 and extends upwardly through a hole 157 in the bottom of the carriage to an arm 158 mounted on a bearing 159 extending inwardly from the rear pillow block 61. A curved trip 160 is attached to the arm 158 and turns with it on the same bearing 159. This trip extends down toward the carriage into the direct path of the pin 120, the same pin which actuates the cam strip 113. With each backward stroke of the cross-head 44, the trip 160 is engaged by the inner end of this pin 120. This rocks the arm 158 downwardly, and through the rod 155 and with it the lever 151, which in turn forces the hook 146 downwardly to throw the severed bits of warp thread down through the waste-box 145.

Figure 11:
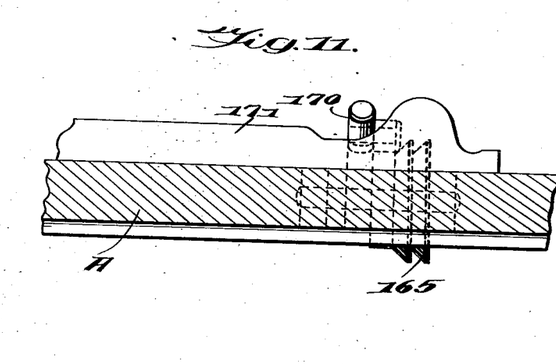
Fig. 11 is a section on the line 11—11 of Fig. 10.
Figure 12:
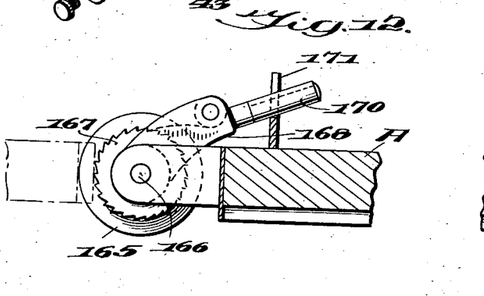
Fig. 12 is a section on the line 12—12 of Fig. 10.
Figures 13, 14:
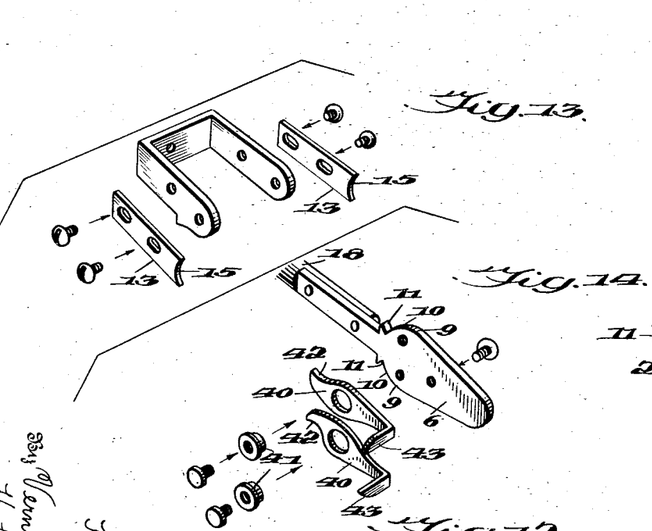
Figs. 13 and 14 are details.
Figure 16:
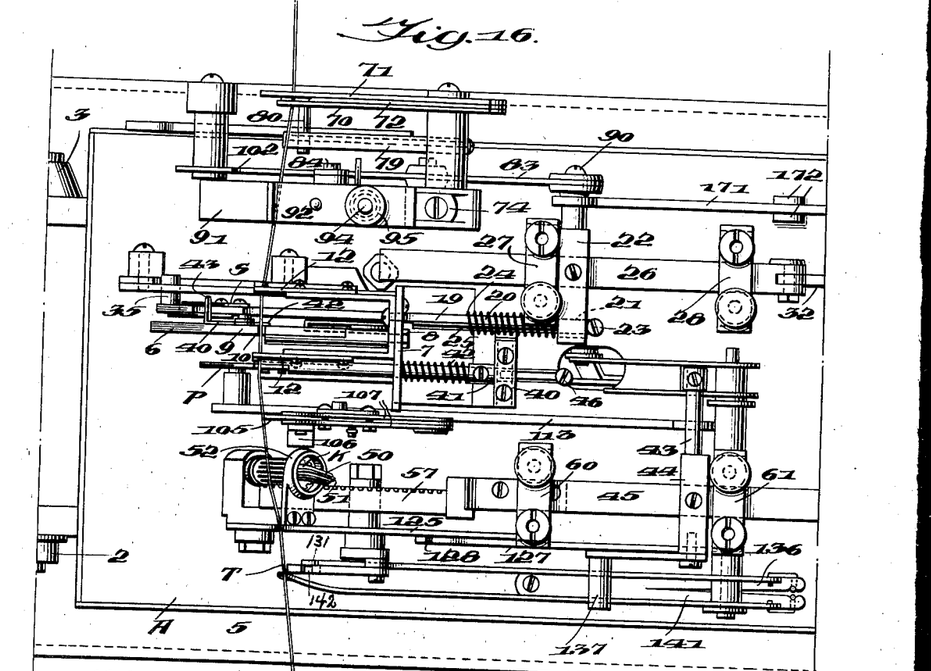
Fig. 16 is an enlarged plan view of the forward end of the machine showing the position of the threads just prior to the back movement of the selector.
Figure 17:
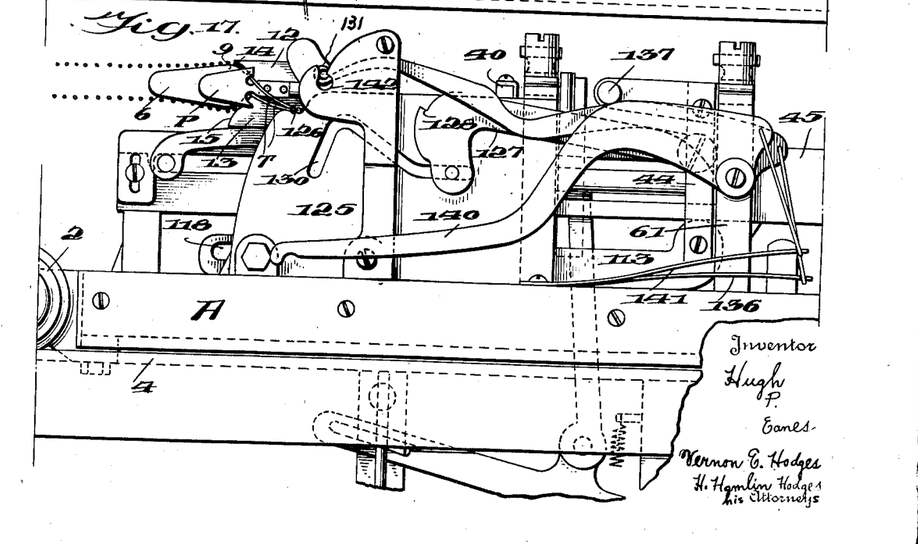
Fig. 17 is a side elevation of the same from the left hand side.
Figure 18:
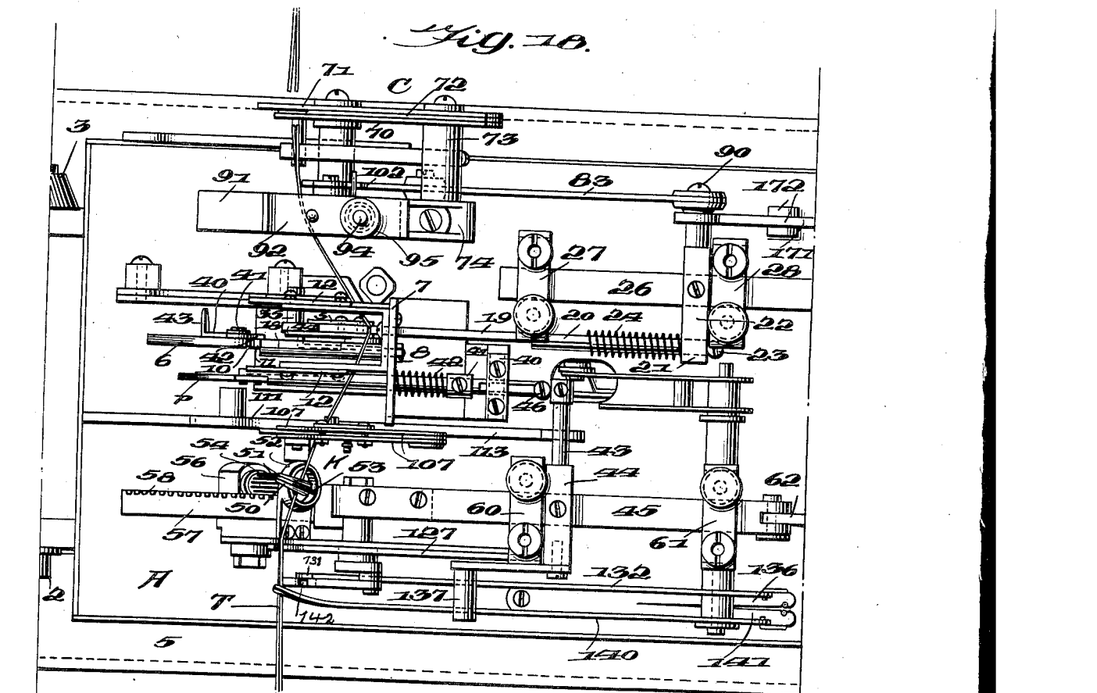
Fig. 18 is a view corresponding to Fig. 16 but showing the threads after they have been severed by the cutters C and drawn back between the tension 106 and 107 and in position with respect to the cutter initiatory to tying the knot.
Figure 19:
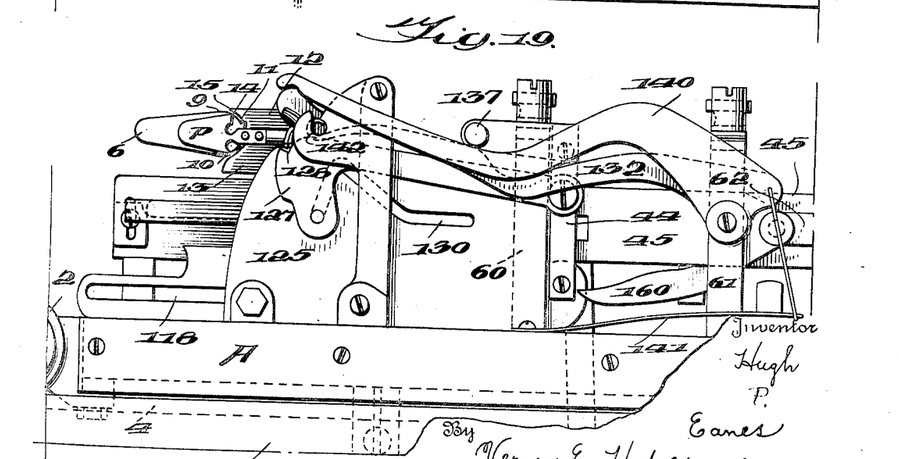
Fig. 19 is a side elevation of the same.
Figure 20:
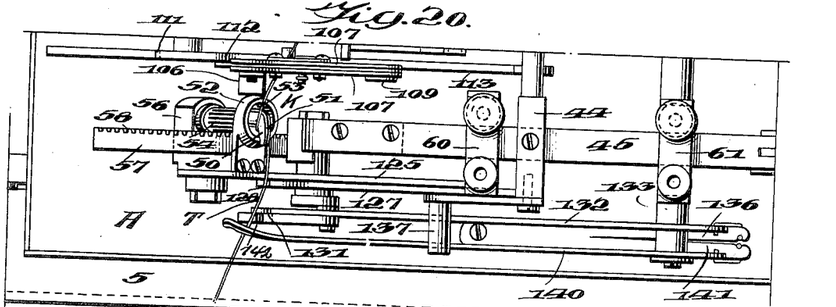
Fig. 20 is a plan view of the left hand portion of the forward end of the machine showing the knotter and cooperating parts in another position with the loop partly formed.
Figure 21:
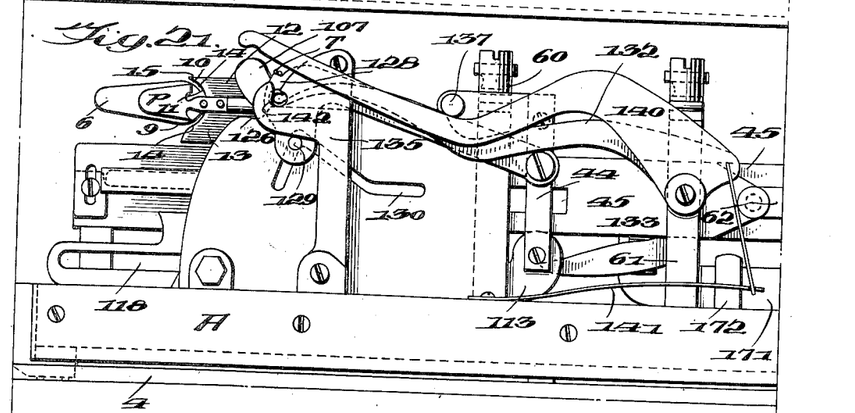
Fig. 21 is a side elevation of the same.
Figure 22:
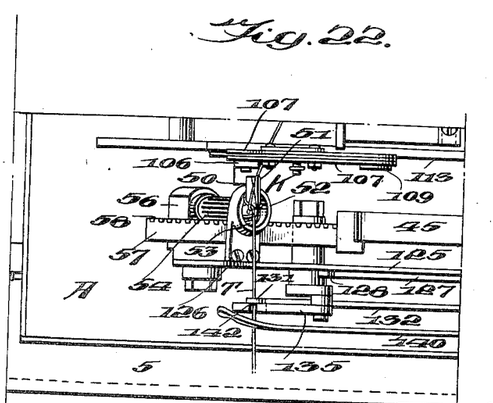
Figs. 22 and 23 are partial plan views of the forward end of the machine showing different stages in the formation and release of the knot.
Figure 23:
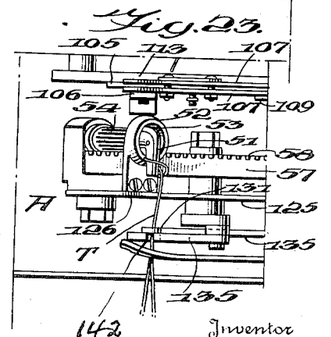
Figure 24:
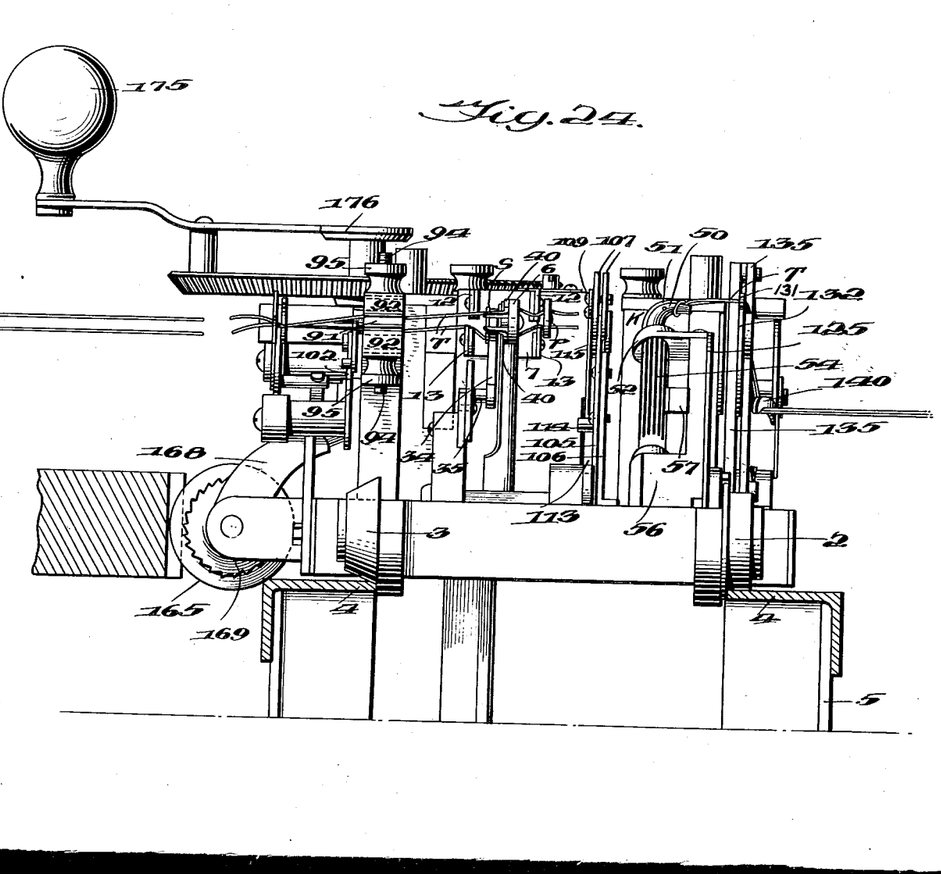
Fig. 24 is a view in front elevation.

It is understood that the warps are combed or otherwise laid over a rack in two layers (not shown) and that the carriage with all the foregoing mechanism thereon is moved forward toward the two layers of warp thread. The following is a simple mechanism for propelling the carriage forward at the required speed:

A worm gear 165 is loosely mounted on a stub-shaft 166 located on the right-hand side of the carriage (see Figs. 2, 3, 10 and 12). This worm-gear engages the teeth of a worm rack on the bed of the machine. It is turned by intermittent or step by step motion. On the forward side of the worm gear is a ratchet toothed wheel 167. A gravity arm 168 is mounted loosely on the stub-shaft 166, adjacent to the ratchet toothed wheel 167, and this gravity arm carries a pivotally mounted gravity pawl 169, which rests by its own weight on the teeth of the ratchet toothed wheel. The arm 168 carries an anti-friction roller 170 which rests by gravity upon the cam strip 171 (see Figs. 10, 11 and 12). This cam strip 171 rests and slides back and forth upon the carriage and is guided between two lugs 172, and the forward end of the cam strip is held by the same bolt 90 which connects the cam strip 83 to the cross head 22. The backward and forward movement of the cam strip 171 actuates the arm 168, which latter through the pawl and ratchet-wheel turns the worm-gear 165 to propel the carriage forward by a step by step motion.

The entire mechanism may be driven by any power desired, as for example by a hand crank 175 secured on a crown gear-wheel 176, and the bevel teeth of this gear mesh with the teeth of the bevel gear 177, which latter is keyed on the shaft 31, as shown in Figs. 1, 2, 3 and 10.

As has been previously explained, the plungers 26 and 45 are driven by shaft 31 through connecting rods 32 and 62, respectively, and all the other moving parts are actuated directly or indirectly by the two cross-heads 22 and 44 carried by these plungers.

The operation of the various mechanisms having each in turn been fully described, only a brief summary in general of the operation will follow:

*Operation.*—As the carriage moves forward, the selector S selects one thread from each layer of threads. The next few following threads are being urged around the two shoulders 10 of the spear-head 6, through the two narrow channels 14, which have been accurately adjusted to the size or thickness of the warp threads to be tied by setting the adjustable fingers with relation to the shoulders.

The threads extend transversely of the machine through the cutters on the right side of the machine, between the tongue and jaws of the right-hand tension, through the two channels 14 formed by the finger-tips and shoulders of the arrow-head. The selector draws two threads back, and the cutters sever them as the selector has partially completed its back stroke. The cam levers manipulate the threads by guiding them around and crossing them over the duck-bill of the knotter and between the two bills where they are held while the loop formed over the bills is drawn tight by the downward movement of the left-hand cam lever 140, at which movement the threads are cut adjacent to the finished knot.

The hook 146 rises and falls, and upon the severance of the threads by the knotter it gathers the waste bits into the waste-box through which it works, disposing of them through the hole in the carriage.

I claim:

1. A warp tying mechanism including an arrow-head having rounded shoulders, and fingers the tips of which are curved to correspond with the shape of the shoulders, whereby to form a channel therebetween of a width approximately corresponding to the size or thickness of the warp threads to insure the passage of a single row of successively fed warp threads smoothly around each shoulder, and a selector constructed and adapted to traverse the two planes in which the two innermost threads lie, and to engage both threads substantially simultaneously and bring them into position to be tied.

2. A warp tying mechanism including an arrow-head having rounded shoulders, and fingers the tips of which are curved to correspond with the shape of the shoulders, whereby to form a channel therebetween of a width approximately corresponding to the size or thickness of the warp threads to insure the passage of a single row of successively fed warp threads smoothly around each shoulder, a selector constructed and adapted to traverse the two planes in which the two innermost threads lie, and to engage both threads substantially simultaneously and bring them into position to be tied, and a knotter in position to receive the threads and tie them together.

3. A warp tying mechanism including an arrow-head having rounded shoulders, and fingers the tips of which are curved to correspond with the shape of the shoulders, whereby to form a channel therebetween of a width approximately corresponding to the size or thickness of the warp threads to insure the passage of a single row of successively fed warp threads smoothly around each shoulder, a selector constructed and adapted to traverse the two planes in which the two innermost threads lie, and to engage both threads substantially simultaneously and bring them into position to be tied, a knotter in position to receive the threads and tie them together, and mechanical means for manipulating and holding the threads in position for the knotter to form the knot.

4. A warp tying mechanism including an arrow-head having rounded shoulders, and fingers the tips of which are curved to correspond with the shape of the shoulders, whereby to form a channel therebetween of a width approximately corresponding to the size or thickness of the warp threads to insure the passage of a single row of successively fed warp threads smoothly around each shoulder, a selector constructed and adapted to traverse the two planes in which the two innermost threads lie, and to engage both threads substantially simultaneously and bring them into position to be tied, a knotter in position to receive the threads and tie them together, mechanical means for manipulating and holding the threads in position for the knotter to form the knot, and means independent of the knotter for tightening the knot after it has been formed by the knotter.

5. The combination of a fixed arrow-head having rounded shoulders at its rear end, said arrow-head adapted to pass between the layers of warp thread, a knotter, tension devices, means for forming a channel to insure the successive movement of the warp threads around the rear end of the arrow-head, and a reciprocating selector, the rear ends of which are pointed and caused to travel backward in the two planes of the innermost threads, whereby to select those threads only to the exclusion of the successively following threads, and to engage both threads substantially simultaneously and bring them within reach of the knotter, and means for manipulating the threads to assist the knotter in forming the knot.

6. The combination of a fixed arrow-head having rounded shoulders at its rear end, said arrow-head adapted to pass between the layers of warp thread, a knotter, tension devices, means for forming a channel to insure the successive movement of the warp threads around the rear end of the arrow-head, a reciprocating selector, the rear ends of which are pointed and caused to travel backward in the two planes of the innermost threads, whereby to select those threads only to the exclusion of the successively following threads, and to bring them within reach of the knotter, means for manipulating the threads to assist the knotter in forming the knot, and a reciprocating pusher which urges the threads successively over the shoulders of the arrow-head.

7. The combination of an arrow-head gradually increasing in width toward the rear end, where it terminates in rounded shoulders, and having a notch at the inner end of each shoulder adapted to arrest the two threads to be tied, adjustable means curved at the forward ends to approximately correspond with the curvature of the shoulders, whereby to form a channel therebetween of a width corresponding to the size and thickness of the thread, thereby preserving and insuring an orderly backward movement of the threads in single file, and means for holding the threads taut against these rounded shoulders.

8. The combination of an arrow-head gradually increasing in width toward the rear end, where it terminates in rounded shoulders, and having a notch at the inner end of each shoulder adapted to arrest the two threads to be tied, adjustable means curved at the forward ends to approximately correspond with the curvature of the shoulders, whereby to form a channel therebetween of a width corresponding to the size and thickness of the thread, thereby preserving and insuring an orderly backward movement of the threads in single file, means for holding the threads taut against these rounded shoulders, and a reciprocating selector constructed and adapted to select the two threads in the notches with each backward movement of the selector.

9. The combination of an arrow-head gradually increasing in width toward the rear end, where it terminates in rounded shoulders, and having a notch at the inner end of each shoulder adapted to arrest the two threads to be tied, adjustable means curved at the forward ends to approximately correspond with the curvature of the shoulders, whereby to form a channel therebetween of a width corresponding to the size and thickness of the thread, thereby preserving and insuring an orderly backward movement of the threads in single file, means for holding the threads taut against these rounded shoulders, a reciprocating selector constructed and adapted to select the two threads in the notches with each backward movement of the selector, and a pusher for urging the threads over the shoulders.

10. The combination of a fixed arrow-head having rounded shoulders and a notch at the rear end, rockers pivoted thereto, and having stops at one end, and a seat at the end adjacent to the notch in position to receive pressure from the inmost threads when in the notches, a reciprocating selector, and means thereon in position to engage either of the stops on these rockers upon the failure of a thread to press upon the seat whereby to stop the selector and prevent it from selecting unless it has caught both threads.

11. The combination of a fixed arrow-head, a reciprocating selector and a reciprocating pusher, tension devices on opposite sides of the arrow-head, a knotter, and cam levers for directing and disposing the warp threads to be tied in proper position with respect to the knotter to assist in the formation of the knot in cooperation with the knotter, cutters for cutting the threads at one point, the bills of the knotter having means for cutting the threads at the conclusion of the formation of the knot, and a cam lever for finally tightening the knot just prior to its leaving the knotter.

12. The combination of a fixed arrow-head, a reciprocating selector and a reciprocating pusher, tension devices on opposite sides of the arrow-head, a knotter, and cam levers for directing and disposing the warp threads to be tied in proper position with respect to the knotter to assist in the formation of the knot in cooperation with the knotter, cutters for cutting the threads at one point, the bills of the knotter having means for cutting the threads at the conclusion of the formation of the knot, a cam lever for finally tightening the knot just prior to its leaving the knotter, two reciprocating plungers, means for reciprocating these plungers, pillow-blocks through which the plungers are guided, cross-heads carried by the plungers, and means extending from these cross-heads and the plungers for actuating all of the moving parts of the mechanism.

13. The combination of a fixed arrow-head, a reciprocating selector and a reciprocating pusher, tension devices on opposite sides of the arrow-head, a knotter, and cam levers for directing and disposing the warp threads to be tied in proper position with respect to the knotter to assist in the formation of the knot in cooperation with the knotter, cutters for cutting the threads at one point, the bills of the knotter having means for cutting the threads at the conclusion of the formation of the knot, a cam lever for finally tightening the knot just prior to its leaving the knotter, tension devices on opposite sides of the arrow-head, one of which is located between the arrow-head and the knotter, a waste-box located between the tension devices, and a hook movable up and down in position to grasp and dispose of the short lengths of severed threads.

14. The combination of a carriage, a tapering device adapted to enter between the layers of warp, means for moving the carriage forward, a reciprocating selector, tension means on each side of the selector for holding the threads, a knotter, means for actuating the knotter, cam levers for laying the threads extending from the adjacent tension means in different positions at coordinated and timed intervals with respect to the knotter to assist the latter in forming the knot, and means independent of the knotter for tightening the knot just before the threads leave the knotter.

15. The combination of a carriage, a tapering device adapted to enter between the layers of warp, means for moving the carriage forward, a reciprocating selector, tension means on each side of the selector for holding the threads, a knotter, means for actuating the knotter, cam levers for laying the threads extending from the adjacent tension means in different positions at coordinated and timed intervals with respect to the knotter to assist the latter in forming the knot, means independent of the knotter for tightening the knot just before the threads leave the knotter, reciprocating plungers, driving mechanism for actuating the plungers and also the means for moving the carriage forward, and means carried by the plungers for actuating the selector, the tension means, the knotter, cam levers and the knot tightening means at properly timed intervals.

16. The combination of a carriage, means thereon adapted to enter between and separate the layers of warp threads as the carriage is moved forward, a reciprocating pusher and selector, fingers between the tips of which and the rear end of said means a channel is formed, the width of which is defined by the size or thickness of the warp threads, tension devices located on opposite sides of the pusher and selector, cam levers, a rotary knotter between one of the tension devices and the cam levers, said levers constructed and adapted to lay the warp threads in the different positions with respect to the knotter to cooperate therewith in the formation of the knot, a cutter for severing the threads, and means for actuating the several recited co-operating elements at predetermined and properly timed intervals.

17. The combination of a carriage, means thereon adapted to enter between and separate the layers of warp threads as the carriage is moved forward, a reciprocating pusher and selector, fingers between the tips of which and the rear end of said means a channel is formed, the width of which is defined by the size or thickness of the warp threads, tension devices located on opposite sides of the pusher and selector, cam levers, a rotary knotter between one of the tension devices and the cam levers, said levers constructed and adapted to lay the warp threads in the different positions with respect to the knotter to co-operate therewith in the formation of the knot, a cutter for severing the threads, and means for actuating the several recited cooperating elements at predetermined and properly timed intervals, said last-mentioned means including two reciprocating plungers, driving mechanism for reciprocating the plungers and for propelling the carriage forward.

18. The combination of a movable carriage, means thereon adapted to enter between and separate the layers of warp threads as the carriage is moved forward, a reciprocating pusher and selector, fingers between the tips of which and the rear end of said means a channel is formed, the width of which is defined by the size or thickness of the warp thread, cam levers, a knotter, said levers constructed and adapted to lay the warp threads in the different positions with respect to the knotter to cooperate therewith in the formation of the knot, a cutter for severing the threads, and means for actuating the several recited cooperating elements at predetermined and properly timed intervals.

HUGH P. EANES.